United States Patent
Warren

[15] 3,691,456
[45] Sept. 12, 1972

[54] METHODS AND APPARATUS FOR INVESTIGATING THE SPONTANEOUS POTENTIAL OF EARTH FORMATIONS

[72] Inventor: John P. Warren, Houston, Tex.
[73] Assignee: Schlumberger Technology Corporation, New York, N.Y.
[22] Filed: Jan. 4, 1971
[21] Appl. No.: 103,448

[52] U.S. Cl. .................................................324/10
[51] Int. Cl. .............................................G01v 3/18
[58] Field of Search ............324/1, 8, 10; 340/18 DC

[56] References Cited

UNITED STATES PATENTS

| | | | |
|---|---|---|---|
| 3,268,801 | 8/1966 | Clements et al. | .............324/10 |
| 3,488,658 | 1/1970 | Tanguy | .................340/18 DC |
| 3,497,958 | 3/1970 | Gollwitzer | ....................33/133 |

Primary Examiner—Gerard R. Strecker
Attorney—Stewart F. Moore, Jerry M. Presson, Edward M. Roney, William R. Sherman, David L. Moseley, Michael J. Berger, James C. Kesterson and Ernest R. Archambeau

[57] ABSTRACT

In accordance with illustrative embodiments of the present invention, a technique is disclosed for substantially eliminating noise from measurements of the spontaneous potential made in a borehole drilled into the earth. An exploring device in the borehole carries two closely spaced electrodes and the potential is measured between these two electrodes to provide a first differential type measurement as a function of the movement of the electrodes. A converting circuit converts this first measurement from a function of such movement to a function of time. The potential between one of these two electrodes and a remote point is measured to produce a second measurement. The converted first measurement and the second measurement are combined to provide a substantially error free spontaneous potential measurement. To compensate for errors produced in the converting circuit by acceleration of the electrodes, the low frequency components of the first measurement are eliminated prior to combining the two measurements.

5 Claims, 4 Drawing Figures

INVENTOR.
John P. Warren

METHODS AND APPARATUS FOR INVESTIGATING THE SPONTANEOUS POTENTIAL OF EARTH FORMATIONS

This invention relates to well logging methods and apparatus and more specifically to methods and apparatus for obtaining indications of spontaneous potentials existing in earth formations traversed by a borehole.

The spontaneous potential, or self potential, hereinafter called SP, is the potential produced naturally by electrochemical phenomena in the formations. This electrochemical phenomena causes electromotive forces to be produced at the contacts between the drilling mud or its filtrate and the formation water in the pores of the permeable beds and across the adjacent shales. In the typical SP logging method, the potential is measured between a surface reference electrode and an electrode in the column of conductive mud as this latter electrode is pulled up past different formations. The character of the SP log produced by such measurements depends a great deal upon the mud and the formations encountered and is used to detect permeable beds and obtain values of formation water resistivity.

While systems for measuring the SP have proved generally satisfactory in the past, there are unfortunately a number of factors which can cause errors to be introduced into the usual SP measurement when utilizing the usual measuring systems. For example, magnetism noise is many times induced into the SP wire which is connected to the reference electrode at the surface of the earth by the magnetic field of a magnetized moving part of the reeling mechanism which pays out or takes in the cable at the surface of the earth.

Additionally, stray currents from a variety of different sources can affect the potential at the surface SP reference electrode. Since the potential difference between this surface reference electrode and the downhole SP electrode is measured, this noise potential on the surface SP electrode will show up in the SP log as noise. One such cause of surface electrode noise results from varying potentials in the earth due to current created by a voltaic cell produced by the interaction of the cable armor, mud, and the casing lining the borehole. The current from this voltaic cell is erratic because of intermittent contact between the cable armor and casing. Another cause of such surface electrode noise arises from the magnetic field set up by generators and motors at the well site. Another source of noise which affects the potential at the surface SP electrode is so-called telluric currents. Telluric currents are natural alternating electric currents flowing in essentially horizontal sheets near the surface of the earth. These telluric currents are induced in the earth by current circulating in the upper atmosphere which becomes highly conducting under the ionizing action of radiation from the sun.

These problems affecting the stability of the surface SP electrode become even more acute when offshore wells are logged. The primary reason for this is that it is difficult to isolate the SP surface reference electrode because of the conductive sea water. Also, the proximity of various metals in a good electrolyte (sea water) leads to all kinds of voltaic cells which vary with wave action.

In addition to noise affecting the surface SP electrode, there are also a number of sources of noise which affect the downhole SP electrode. One such cause of this noise is the bimetallism noise caused by currents in the formation and mud column generated by a voltaic cell between dissimilar metals of the downhole logging apparatus. Additionally, noise produced by polarization of the downhole SP electrode causes the potential of this electrode to vary in an undesirable manner. However, the magnitude of this polarization noise is usually so low as to be unimportant. The polarization noise is primarily a DC or base line drift type noise and the other previously mentioned noises are primarily AC or high frequency type noises.

To produce a noiseless SP log, it has been previously suggested to measure the differential SP or SP gradient, i.e., the difference in potential between two relatively closely spaced downhole electrodes, and integrate this difference in potential to arrive at the true SP value. However, any DC type noise caused by polarization, or amplifier zero error, will be converted into a very large error in a relatively short time by the integrator in such a system.

The above problems have been substantially solved by a technique described in copending application Ser. No. 881,793 filed by N.A. Schuster on December 3, 1969, now U.S. Pat. No. 3,638,105, and assigned to the same assignee as the present invention. In this copending Schuster application, low and high pass filters are used to filter out noise and produce a signal substantially free of error. Since analog filters operate in the time domain and the SP is measured as a function of depth, the time constants of the filters are varied as a function of depth. For reasons to be described in detail later, this conversion process introduces certain errors into the computed results under certain circumstances.

It is therefore an object of the present invention to provide new and improved methods and apparatus for providing accurate indications of the spontaneous potential of earth formations traversed by a borehole.

In accordance with the present invention, methods and apparatus for investigating the spontaneous potential of earth formations traversed by a borehole comprise measuring the difference between the potential at two locations in the earth which are separated by a relatively great distance. The systems further comprise measuring the potential gradient in the borehole at a location in the vicinity of one of the electrodes and combining the two measurements to produce a compensated measure of the spontaneous potential. In combining the measurements, the gradient signal is converted from a function of distance to a function of time. Then, to minimize certain problems that occur when the cable supporting the gradient measuring portion of the measuring apparatus changes velocity, the low frequency components of the gradient signal are eliminated.

For a better understanding of the present invention, together with other and further objects thereof, reference is had to the following description taken in connection with the accompanying drawings, the scope of the invention being pointed out in the appended claims.

Referring to the drawings.

Figures 1, 2:
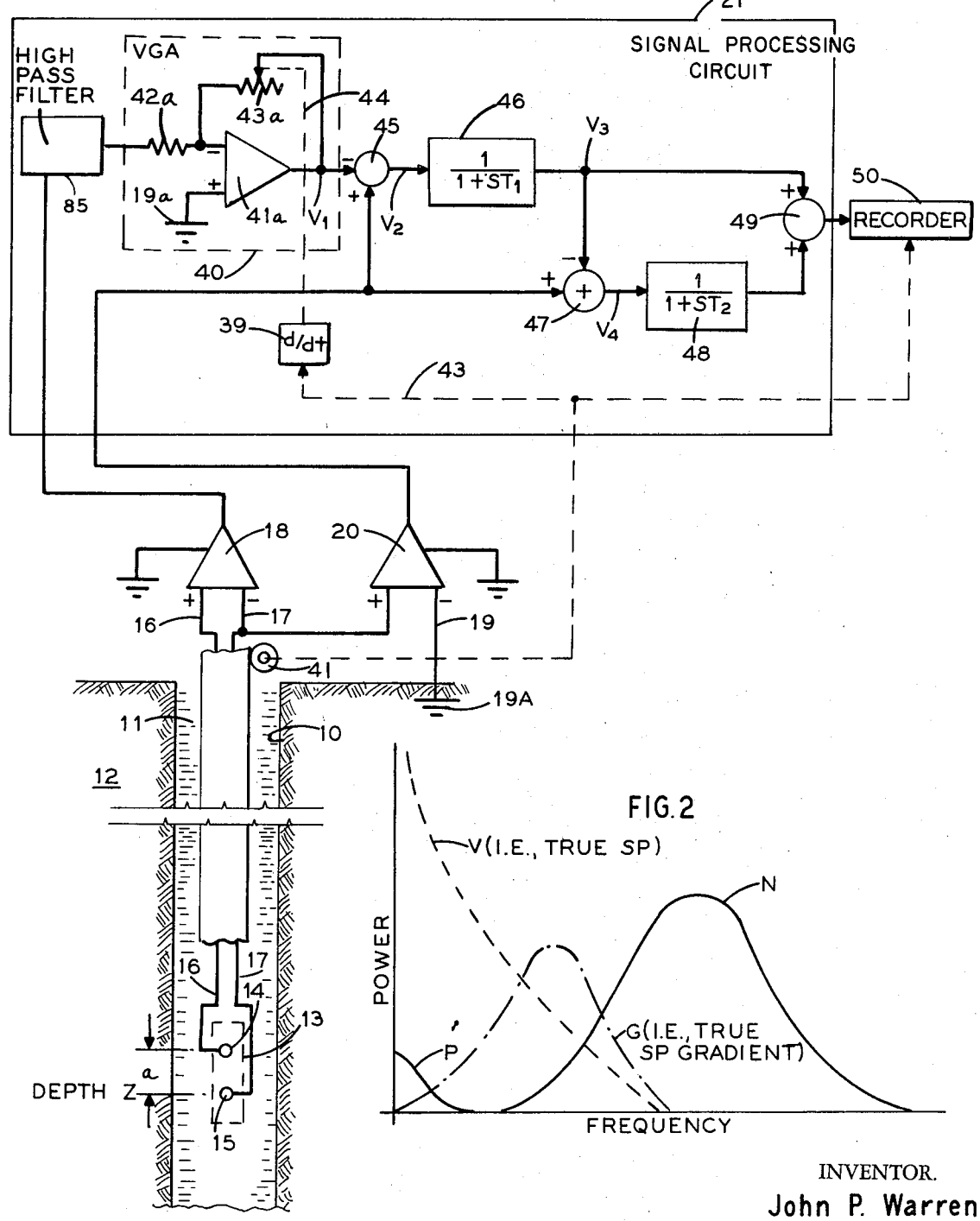
FIG. 1 is a schematic diagram of one embodiment of the present invention for obtaining indications of the spontaneous potentials of the earth formations traversed by a borehole.
FIG. 2 is a graph of power versus frequency for various components of the signals produced by the electrodes of FIG. 1.

Referring now to FIG. 1, there is shown a borehole 10 filled with a suitable conductive drilling mud 11 traversing earth formations 12. An electrode array 13 having electrodes 14 and 15 vertically spaced apart from one another by a distance a are supported in the borehole 10 on the end of a multiconductor cable for logging the spontaneous potential of the formations 12. A pair of conductors 16 and 17 connect the downhole electrodes 14 and 15 to the surface of the earth where the potentials picked up by the electrodes 14 and 15 are processed to produce indications of the spontaneous potentials of the adjoining earth formations 12.

At the surface, the conductors 16 and 17 are applied to the input of a differential amplifier 18 which subtracts the potential of the lower electrode 15 from the potential of the upper electrode 14 to produce an output signal ΔSP proportional to the potential difference or gradient between electrodes 14 and 15. The conductor 17 and a conductor 19 connected to an electrode 19a embedded in the earth at the surface of the earth are connected to the inputs of a differential amplifier 20 to produce an output signal representative of the potential difference between the potentials on these two electrodes. This output signal from amplifier 20 corresponds to the usual spontaneous potential measured heretofore and is designated SP. These output signals from amplifiers 18 and 20 are then applied to a signal processing circuit 21 which processes these applied input signals to produce an improved SP measurement. This improved SP measurement is applied to a galvanometer recorder 50.

Before discussing how the signal processing circuit 21 operates to produce an improved SP output signal, it would first be in order to discuss some theoretical considerations. The usual SP measurement represented by the output signal from amplifier 20 is subject to several types of noise as discussed earlier. This noise can be broken down into two categories, high frequency noise and low frequency noise. The high frequency noise, as discussed earlier, is caused by such things as telluric currents, bimetallism, drilling rig noise, etc., which generally have a period which is on the order of a few seconds or less. The DC or low frequency noise generally results from electrode polarization and is not usually troublesome as concerns this usual SP measurement because of the low magnitude of this polarization noise relative to the measured SP. However, as discussed earlier, the high frequency noise is usually troublesome as concerns the usual SP measurement (output of amplifier 20). Therefore, the output signal SP from amplifier 20 can be designated V + N where V is the true SP signal (i.e., is equal to the potential measured between electrodes 15 and 19a if noise were absent) and N is the high frequency noise component.

The ΔSP signal from amplifier 18 is for the most part free of these AC or high frequency noise components. The reason for this is that AC type noise sources are generally non-local or remote relative to the electrodes 14 or 15 and thus will affect the potential on the electrodes 14 and 15 similarly. Thus, since the differential amplifier 18 subtracts the potential on one electrode from the potential on the other electrode, this AC type noise is usually canceled out.

The same is not true, however, for errors caused by polarization of the electrodes 14 and 15 since polarization is a local effect, i.e., it affects each electrode in an individual manner. As discussed earlier, the polarization noise is small relative to the total SP measurement such that it can for all practical purposes be ignored. However, since the ΔSP or gradient is the difference in potential between two closely spaced points in the borehole, this ΔSP or gradient signal will be relatively small in magnitude, thus rendering the polarization noise components important, especially after integration. Therefore, the output signal from amplifier 18 contains both a true, noiseless gradient signal, designated G, and polarization noise, designated P. This output signal ΔSP is thus equal to G + P.

It can thus be seen that the signal ΔSP from amplifier 18 contains valuable high frequency information but poor low frequency information because of the polarization error. The conventional SP measurement contains valuable low frequency information but poor high frequency information because of the high frequency noise N. This is better illustrated in FIG. 2 where there is shown a plot of power versus frequency for the above discussed signal components. It can be seen that the true noiseless SP, represented as the dashed line curve V, has a large amount of power at low frequencies and rapidly decreases to very little power at higher frequencies. The true, noiseless gradient signal G, represented as the dash dot line curve, has very little low frequency power and a significant amount of intermediate or high frequency power. The polarization noise P, on the other hand, has a significant amount of low frequency power and rapidly diminishes to zero power as the frequency increases. The high frequency noise component N has no power at low frequencies but a significant amount of power at high frequencies.

From FIG. 2, since the SP measurement signal is V + N and the measured gradient signal ΔSP is equal to G + P, it can be seen that the conventional SP measurement from amplifier 20 can be utilized for its low frequency information and the SP difference measurement, i.e., ΔSP, from amplifier 18 can be utilized for its high frequency information. That is to say, the distribution of power versus frequency for these signals is such that the noise components N and P can be readily separated from the information components V and G for each of the derived signals SP and ΔSP. In accordance with the teachings of the copending Schuster application, both the SP and ΔSP measurements are combined in a manner to detect the low frequency component of the SP measurement and the high frequency component of the ΔSP measurement. These detected components are combined to arrive at a compensated SP measurement.

The ΔSP gradient signal output from amplifier 18 is given by the expression:

$$\Delta SP = G + P = V(z+a) - V(z) + P \approx a\frac{dV}{dz} + P \quad (1)$$

where $V(z)$ is the true $SP$ at the depth level $z$ in the borehole, and $V(z+a)$ is the true $SP$ at the depth level $z+a$ in the borehole. Since analog type circuits operate in the time domain it would first be desirable to examine equation (1) written as a function of time. In this case, equation (1) becomes:

$$\Delta SP = a\frac{dV}{dt} \cdot \frac{dt}{dz} + P = \frac{a}{u}\frac{dV}{dt} + P \qquad (2)$$

where $u$ is the velocity $(dz/dt)$ of the electrode array. In Laplace transform notation, equation (2) can be expressed as:

$$L(\Delta SP) = S\tau\tilde{V}(z) + \tilde{P} \qquad (3)$$

where $$\tau = a/u \qquad (4)$$

The expression for the signal output from amplifier 20 is:

$$SP = V(z) - V_o + N \qquad (5)$$

re $V_o$ is the voltage on the $SP$ surface electrode 19a. Since $V_o$ would ordinarily be zero volts except for the effect of the noise component N, equation (5) can be rewritten as:

$$SP = V(z) + N \qquad (6)$$

The Laplace transform for equation (6) is:

$$L(SP) = \tilde{V}(z) + \tilde{N} \qquad (7)$$

$\tilde{V}(z)$ will hereafter be referred to simply as $\tilde{V}$.

From FIG. 2, since the desired $V$ term has maximum power at low frequency and the undesired noise term $N$ has maximum power at high frequencies, it is clear that these two terms, $V$ and $N$, should be passed at low frequencies only. On the other hand, since the desired gradient term $G$ has maximum power at mid or high frequencies and the undesired noise term $P$ has maximum power at low frequencies, it is clear that these two terms, $G$ and $P$, should be passed at high frequencies only. Therefore, the expression for the output signal $e_o$ from the signal processing circuit 21 should desirably be:

$$\tilde{e}_o = L(\tilde{V} + \tilde{N}) + H(S\tau\tilde{V} + \tilde{P}) \qquad (8)$$

or $$\tilde{e}_o = (L + S\tau H)\tilde{V} + L\tilde{N} + H\tilde{P} \qquad (9)$$

where $L$ and $H$ are low and high frequency transfer functions respectively.

From equation (9), the condition for faithfully reproducing the true $SP$ term $V$ is:

$$L + S\tau H = 1 \qquad (10)$$

Returning to FIG. 1 to explain the operation of the signal processing circuit 21, the $\Delta SP$ signal is applied via a high pass filter 85 to the input of a variable gain amplifier 40 of gain $K$, where $K$ is variable as a function of the velocity of the cable at the surface of the earth. To effect this control, a rotating wheel 41 engages the cable 11 so as to rotate as a function of the movement of the cable 11. A rotating shaft 43 is driven by the wheel 41 and is applied to the variable gain amplifier 40 to vary the gain thereof as a function of cable velocity.

In the variable gain amplifier 40, the $\Delta SP$ input signal is applied via an input resistor 42a to one input of an operational amplifier 41a, the other input thereto being connected to the surface $SP$ electrode 19a. The feedback resistor for operational amplifier 41a is a potentiometer 43a whose wiper arm is driven by a shaft 44 from a ratemeter 39 which, in response to the rate of rotation of shaft 43, causes the shaft 44 to move as a function of the rate of rotation of shaft 43. Since the gain of amplifier 40 is the ratio of the feedback resistance to the input resistance and the value of the feedback resistor 43a is varied as a function of cable velocity, it can be seen that the gain of amplifier 40 will vary as a function of cable velocity.

The output signal from variable gain amplifier 40 is applied to a summing junction 45 to which is also applied the regular $SP$ signal from the amplifier 20 of FIG. 1. The output signal from summing junction 45 is applied to a first low pass filter 46 having a Laplace transfer function $1/(1 + ST_1)$ where $T_1$ is the circuit 46 time constant. The inverse of the output signal from filter 46, and the $SP$ input signal are summed by a summing junction 47 for application to a second low pass filter 48 having a Laplace transfer function $1/1 + ST_2$ where $T_2$ is the circuit 48 time constant. The output signals from both low pass filters 46 and 48 are summed by a summing junction 49 for application to a recorder 50 whose recording medium is driven by the shaft 43 as a function of cable movement. Therefore, the compensated $SP$ output signal from signal processing circuit 21 is recorded by the recorder 50 as a function of borehole depth.

The expressions for $L$ and $H$ from FIG. 1 are:

$$L = \frac{1}{1+ST_1}\left(1 - \frac{1}{1+ST_2}\right) + \frac{1}{1+ST_2} \qquad (11)$$

or $$L = \frac{1+S(T_1+T_2)}{(1+ST_1)(1+ST_2)} \qquad (12)$$

and $$H = \frac{K}{1+ST_1} - \frac{K}{1+ST_1}\frac{1}{1+ST_2} \qquad (13)$$

or $$H = \frac{KST_2}{(1+ST_1)(1+ST_2)} \qquad (14)$$

Equation (12) will be recognized as the Laplace expression for a low pass filter and equation (14) will be recognized as the Laplace expression for a band pass filter.

From equations (12) and (14), the expression $L + S\tau H$ from equation (9) can be written as:

$$L + S\tau H = \frac{1+S(T_1+T_2)+S^2K\tau T_2}{(1+ST_1)(1+ST_2)} \qquad (15)$$

Figure 3:
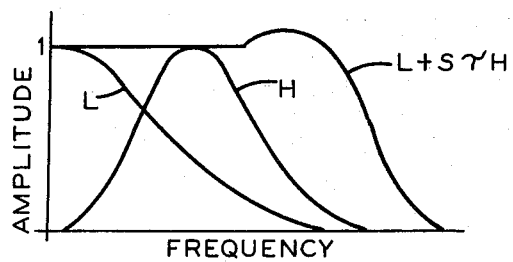
FIG. 3 is an amplitude versus frequency plot for certain circuits of FIG. 1.

Turning now to FIG. 3, there is shown a plot of amplitude versus frequency for the transfer functions $L$, $H$ and $L + S\tau H$ from equations (12), (14), and (15) respectively. From FIG. 3, it can be seen that the low frequency transfer function $L$ describes a low pass filter, the transfer function $H$ describes a band pass filter, and the function $L + S\tau H$ describes a low pass filter with a cutoff frequency higher than that for both the low frequency and high frequency transfer functions $L$ and $H$.

Comparing equation (9) with the plots of FIGS. 2 and 3, it can be seen that by properly selecting the circuit constants for the circuit of FIG. 1, this FIG. 1 circuit will effectively cancel out substantially all of the high frequency noise component $N$ since the transfer function $L$ from FIG. 3 can be chosen to reduce substantially to zero before the noise component becomes important. It can also be seen that the polarization component $P$ will be substantially eliminated since this component $P$ reduces substantially to zero at a frequency lower than the frequency range where transfer function $H$ becomes important. It can also be seen that the true $SP$ component $V$ will be passed throughout the frequency band where $V$ is important since the transfer function $L + S\tau H$ can be chosen not to decrease to zero until a frequency slightly beyond the point where the true $SP$ component $V$ is no longer important.

It can be seen that equation (15) contains a term $\tau$. $\tau$ was earlier defined as being equal to $a/u$ where $a$ is the spacing between electrodes 14 and 15 and $u$ is the velocity of the tool 13 moving through the borehole. If the tool 13 always moved through the borehole at a constant velocity, the circuit of FIG. 1 would always produce accurate results. However, such is not always the case and thus the circuit of FIG. 1 is constructed to compensate for different tool velocities. This compensation is accomplished in FIG. 1 by varying the feedback resistor 43a as a function of tool velocity such that the $K\tau$ term of equation (15) will always be constant. It has been found that desirable results will be obtained if this term $K96$ is set equal to the time constant $T_1$. Thus, setting $K\tau$ equal to $T_1$ in equation (15)

$$L + S\tau H = \frac{1 + S(T_1 + T_2) + S^2 T_1 T_2}{(1 + ST_1)(1 + ST_2)} \quad (16)$$

It can be seen that the numerator portion of equation (16) is equal to the denominator portion thereof such that $L + S\tau H$ is equal to 1 (over the frequency range of interest) in accordance with equation (10). Thus, the true $SP$ component $V$ will be the signal supplied from the signal processing circuit 21 of FIG. 1 to the recorder 50.

While the above described measuring scheme was found to work well for most cases, an error of unknown origin was occasionally introduced into the measurement. After a great deal of experimentation, in accordance with the present invention, it was discovered that polarization was the cause of the error. This can be seen from the following analysis. From equation (9), the polarization term $P$ is multiplied by the transfer function $H$ which, for the FIG. 1 circuit, is given by equation (14). Substituting $T_1 u/a$ for $K$ (since $K\tau = T_1$ and $\tau = a/u$), the filtered polarization term becomes:

$$P \left[ \frac{\frac{u}{a} ST_1 T_2}{(1 + ST_1)(1 + ST_2)} \right] \quad (17)$$

From equation (17) a term $Pu$ appears. Thus, if $u$ changes (i.e., there is some acceleration) and $P$ has any DC level other than zero, a so-called "acceleration step" will result and a transient will appear in $e_o$ because of the action of the high pass transfer function $ST_1 T_{2a}\frac{2}{3}(1 + ST_1)(1 + ST_2)$. Of course such a transient in $e_o$ is undesirable.

To solve this problem in accordance with an illustrative embodiment of the present invention, a high pass filter is inserted in the $S\tau V + P$ input channel of the signal processing circuit of FIG. 1 to cause the DC level of the polarization term $P$ to go to zero. This filter is represented by the high pass filter 85 in FIG. 1.

If the transfer function for high pass filter 85 is $ST_3/1 + ST_3$, then $K$ becomes a new factor, designated $K'$, as follows:

$$K' = \frac{ST_3}{1 + ST_3} \frac{u}{a} T_1 \quad (18)$$

Upon inserting the high pass filter 85 into the FIG. 1 circuit, it would seen necessary to re-evaluate the original choices for the transfer functions $L$ and $H$. However, if $T_3 >> T_1, T_2$, the original choices for $L$ and $H$ can be retained leaving only a negligible departure from unity gain relationship for $L + S\tau H$ given by equation (10).

Figure 4:
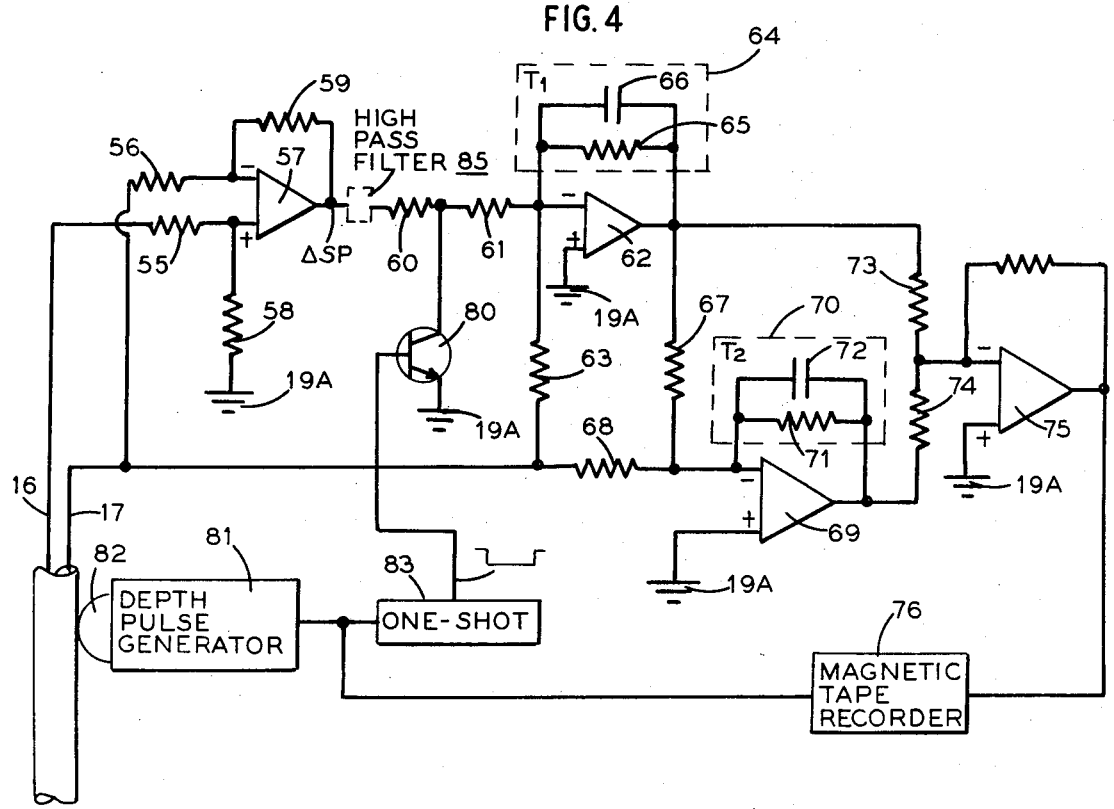
FIG. 4 is a circuit diagram showing certain portions of apparatus of FIG. 1 in greater detail.

Now turning to FIG. 4, there is shown the signal processing circuit 21 of FIG. 1 in greater detail along with another embodiment of a device for varying the gain $K$ as a function of tool velocity. In FIG. 4, the conductors 16 and 17 from the electrodes 14 and 15 respectively of FIG. 1 are connected through input resistors 55 and 56 respectively to the positive and negative inputs respectively of an operational amplifier 57 such that the output signal therefrom will be proportional to $\Delta SP$. The positive input terminal of amplifier 57 is connected via a resistor 58 to surface reference electrode 19a of FIG. 1 and a feedback resistor 59 is connected from the output of amplifier 57 to the negative input hereof. The output signal from amplifier 57 is supplied to a high pass filter 85 in accordance with the present invention. The output of filter 85 is supplied through a pair of resistors 60 and 61 to the negative input of an operational amplifier 62.

The lower $SP$ electrode 15 potential on conductor 17 is supplied via an input resistor 63 to the negative input of operational amplifier 62. A feedback circuit 64 including a resistor 65 and capacitor 66 is connected from the output of amplifier 62 to the negative input terminal thereof. The capacitor 66 and resistor 65 have a time constant $T_1$. The output signal from amplifier 62 and the SP potential on conductor 17 are summed at the negative input terminal of operational amplifier 69 by way of a pair of input resistors 67 and 68 respectively. The positive input terminals of amplifiers 62 and 69 are connected to the surface reference electrode 19a such that the $SP$ potential on conductor 17 will effectively be referenced to the reference potential of surface electrode 19a. The amplifier 69 has a feedback circuit comprising a resistor 71 and capacitor 72 which have a time constant $T_2$.

The output signals from amplifiers 62 and 69 are summed via a pair of resistors 73 and 74 at the negative input terminal of an operational amplifier 75. The output signal from this operational amplifier 75 comprises the compensated $SP$ output signal which is applied to a recorder, in this case a magnetic tape recorder 76, for recording as a function of borehole depth.

To enable RC filters in the FIG. 4 circuit to operate in the time domain on input signals in the depth domain, a switching transistor 80 connects the junction point between the resistors 60 and 61 to ground at periodic time intervals determined by the velocity of the cable. To sense this cable velocity, a suitable depth pulse generator 81, which includes a rotating wheel 82 in engagement with the cable, generates a pulse for each given incremental movement of the cable. These pulses are utilized to energize a fixed time period one-shot 83 which operates to turn the transistor 80 on and off with a repetition rate proportional to cable and tool velocity. For a more detailed explanation of the operation of this velocity correction circuit, see copending application Ser. No. 103,449 filed on January 4, 1971 by William D. Sauter.

It can thus be seen from the foregoing that new methods and apparatus have been set forth for producing a compensated SP measurement which is more accurately representative of the true SP of subsurface formations than has theretofore been available. This has been accomplished by utilizing the teachings of the copending Schuster application and adding a filter to the gradient channel of the processing circuitry for eliminating the error produced by the acceleration step when a significant polarization potential difference exists on the downhole electrodes.

Instead of combining these two measurements as set forth earlier, it would also be possible to record the measurements and visually examine them to obtain some information relating to the true SP. Alternatively, these two measurements could be processed by a properly programmed general purpose digital computer to produce a compensated SP measurement. By utilizing well-known digital filtering techniques, superior filtering of the above discussed measurements could be accomplished.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole, comprising:
    a. support means adapted to carry at least one electrode through a borehole;
    b. a cable supporting said support means for movement through a borehole;
    c. means for measuring the potential gradient over a distance in the borehole in the vicinity of said at least one electrode to produce a first measurement;
    d. means for measuring the difference between the potential at said at least one electrode and the potential at a relatively remote point to produce a second measurement; and
    e. means for combining said first and second measurements to produce an output signal which is representative of a formation characteristic, said combining means including means responsive to the velocity ($dZ/dt$) of said cable through said borehole for converting said first measurement from a function of distance ($dZ$) to a function of time ($dt$), thereby to permit said combining means to operate as a function of time, and for filtering out the low frequency components of said first measurement to produce a signal adapted for combination with said second measurement to thereby produce said output signal.

2. The apparatus of claim 1 wherein said combining means includes filter means for eliminating the low frequency components of said first measurement to produce a filtered first measurement, said converting means being operative to convert said filtered first measurement from a function of distance ($dZ$) to a function of time ($dt$) to produce a filtered, converted first measurement, and second filter means responsive to said filtered, converted first measurement and said second measurement for producing said output signal representative of a formation characteristic.

3. Apparatus for investigating earth formations traversed by a borehole, comprising:
    a. support means adapted to carry at least two electrodes separated by a distance a through a borehole;
    b. a cable supporting said support means for movement through a borehole;
    c. means for measuring the difference between the potentials on said two electrodes to produce a first measurement $\Delta SP$;
    d. means for measuring the difference between the potential on one of said two electrodes and the potential at a relatively remote point to produce a second measurement $SP$;
    e. filter means for filtering out the low frequency components of said first measurement to produce a filtered first measurement $e$, said filter means having a transfer function of $$ST_3/(1+ST_3)$$

where $S$ is the Laplace operator, and $T_3$ is the time constant of said filter means; and
    f. combining means responsive to the velocity ($dZ/dt$) of said cable through the borehole for combining said first and second measurements to produce an output signal $e_0$ which is representative of a formation characteristic and defined by the expression $$e_0 = SP\left[\frac{1+S(T_1+T_2)}{(1+ST_1)(1+ST_2)}\right] + e_1\left[\frac{\frac{u}{a}ST_1T_2}{(1+ST_1)(1+ST_2)}\right]$$

where $T_1$ and $T_2$ are time constants given by said combining means, and $u$ is the velocity ($dZ/dt$) of said cable.

4. A method of investigating earth formations traversed by a borehole, comprising:
    a. moving at least one electrode through a borehole;
    b. measuring the potential gradient over a distance in the borehole in the vicinity of said at least one electrode to produce a first measurement;
    c. measuring the difference between the potential on said at least one electrode and the potential at a relatively remote point to produce a second measurement; and
    d. combining said first and second measurements to produce an output signal which is representative of a formation characteristic, including converting said first measurement from a function of distance ($dZ$) to a function of time ($dt$), thereby permitting the combining of said first and second measurements to be carried out as a function of time, and filtering out the low frequency components of said first measurement to produce a signal for combination with said second measurement to thereby produce said output signal.

5. A method of investigating the spontaneous potential of earth formations traversed by a borehole, comprising:
   a. carrying at least two electrodes through a borehole with a cable;
   b. measuring the difference between the potentials at said two electrodes to produce a first measurement which is proportional to $dV/dZ$, where $V$ is potential and $Z$ is distance;
   c. measuring the difference between the potential at one of said two electrodes and the potential at a relatively remote point to produce a second measurement;
   d. filtering out the low frequency components of said first measurement to produce a filtered first measurement;
   e. detecting the velocity ($dZ/dt$) of movement of said cable through the borehole;
   f. employing said velocity detection to convert said filtered first measurement from a function of distance ($dZ$) to a function of time ($dt$) to produce a converted, filtered first measurement; and
   g. combining said converted, filtered first measurement with said second measurement to produce a measure of the spontaneous potential in the formation adjacent said two electrodes.

\* \* \* \* \*

PO-1050
(5/69)

UNITED STATES PATENT OFFICE
CERTIFICATE OF CORRECTION

Patent No. 3,691,456          Dated September 12, 1972

Inventor(s) John P. Warren

It is certified that error appears in the above-identified patent and that said Letters Patent are hereby corrected as shown below:

Col. 5, line 22, "re" should read --where--. Col. 7, line 28, "K96" should be --K$\tau$--; line 60, "$ST_1T_{2a}2/3(1+\overline{ST_1})(1+ST_2)$" should read --$ST_1T_2/(1+ST_1)(1+ST_2)$--; line 64, "$S\tau V + P$" should read --$S\tau \hat{V} + \bar{P}$--. Col. 8, line 8, "seen" should read --seem--. Col. 9, lines 60-64, should read --to operate as a function of time, first filter means for filtering out the low-frequency components of said first measurement to produce a filtered first measurement, and means for subsequent frequency selective combination of said converted, filtered first measurement with said second measurement to thereby produce said output signal.--. Col. 9, line 65 - Col. 10, line 1, should read --The apparatus of claim 1 wherein said converting--. Col. 10, line 2, "being" should read --is--; line 5, "and second filter means" should read --and said combining means includes second filter means--; line 26, "e," should read --$e_1$,--; line 59, "including converting" should read --including (1) filtering out the low-frequency components of said first measurement to produce a filtered first measurement, (2) converting--; line 60, "said first measurement" should read --said filtered first measurement--; lines 64-66, should read --(3) frequency selectively combining said converted, filtered first measurement with said second measurement to thereby--. Col. 12, line 10, "g. combining" should read --g. frequency selectively combining--.

Signed and sealed this 8th day of May 1973.

(SEAL)
Attest:

EDWARD M. FLETCHER, JR.
Attesting Officer

ROBERT GOTTSCHALK
Commissioner of Patents